Aug. 28, 1923.

W. S. NICHOLSON

CANDY DEPOSITOR

Filed Feb. 13, 1920

INVENTOR.
William S. Nicholson
BY
ATTORNEYS.

Patented Aug. 28, 1923.                                                    1,466,338

UNITED STATES PATENT OFFICE.

WILLIAM S. NICHOLSON, OF ROCHESTER, NEW YORK.

CANDY DEPOSITOR.

Application filed February 13, 1920. Serial No. 358,556.

*To all whom it may concern:*

Be it known that I, WILLIAM S. NICHOLSON, a citizen of the United States, and resident of Rochester, in the county of Monroe and State of New York, have invented certain new and useful Improvments in Candy Depositors, of which the following is a specification.

The present invention relates to candy depositors of the type in which the candy is fed from a hopper or container to trays which are moved intermittently, the candy being deposited in the trays while the latter are still. An object of this invention is to associate with the depositing machine, a mechanism which will deposit starch or similar material upon the candy in the trays while the trays are moving, the mechanism being inoperative while the trays are standing still so that an undue amount of starch will not be fed to the candy at certain points in the travel of the trays.

To this and other ends, the invention consists of certain parts and combinations of parts all of which will be hereinafter described, the novel features being pointed out in the appended claims.

In the drawings:—

Figure 1:
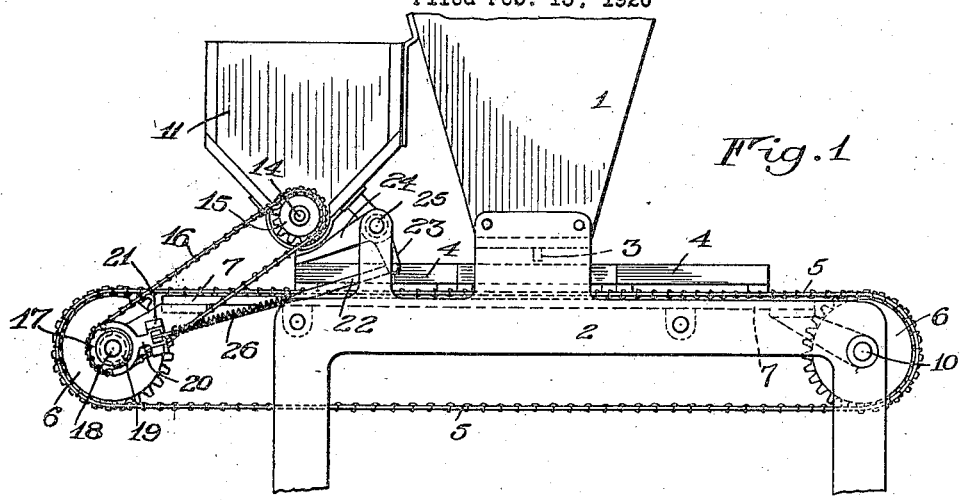
Fig. 1 is a fragmentary view of a candy depositor with the invention applied thereto.
Figure 2:
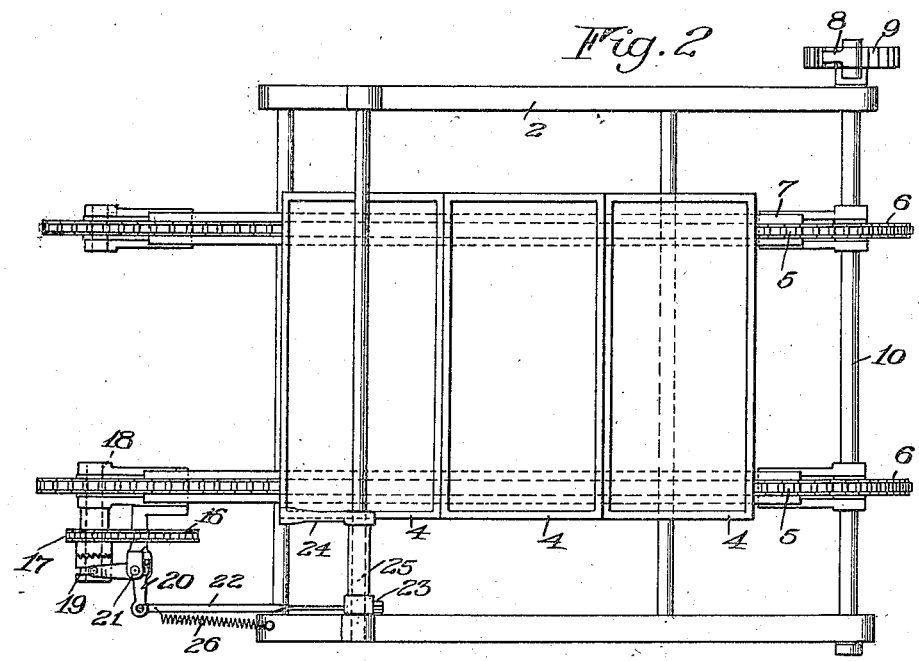
Fig. 2 is a fragmentary view showing the connection between the depositor and the starch feeder.
Figure 3:
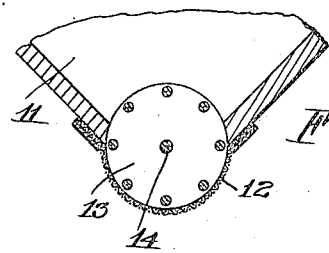
Fig. 3 is a detail sectional view of the starch feeding mechanism.

The depositing machine which may be of any suitable make or construction embodies preferably as is common in the art, a hopper 1 supported on the frame 2 and having a discharge 3 past which the trays 4 are moved by a step-by-step or intermittently operating feeding mechanism of any desired type. In this instance, the step-by-step mechanism comprises two endless carriers 5 mounted in parallel relation on a pulley 6, said carriers operating on guides 7 extending below the hopper 1. The endless carriers project from opposite sides of the hopper and the trays 4 are placed upon the carriers at one side of the hopper to be carried by the step-by-step movement beneath the hopper and then from the opposite side, the step-by-step movement being effected in this instance by a swinging ratchet 8 operated by a suitable means and cooperating with a ratchet wheel 9 on the shaft 10 which supports two of the sprocket wheels 6.

The feature of this invention is the mechanism for feeding or depositing starch or similar material upon the candy in the trays 4 after the trays have passed beyond the hopper 1. This mechanism, in this instance, consists of a hopper or receptacle 11 having a discharge opening in the bottom thereof covered by a sieve 12 over which operates an agitator 13 preferably of rotary form, turning about an axis 14, the sieve retaining the material against falling from the hopper except when the agitator 13 is operated. The agitator 13 is operated intermittently and in timed relation to the step-by-step feeding mechanism of the trays, and this is effected preferably through a sprocket 15 arranged on the shaft of the agitator 13 and connected by a sprocket chain 16 with a sprocket wheel 17 on the shaft 18 on which one of the sprockets 6 is also mounted. It is apparent that the agitator will be operated intermittently or step-by-step with the intermittent operation of the trays, so that feeding of the starch will be stopped while the trays are stationary or receiving candy of the hopper 1.

There may also be associated with the starch feeding mechanism, a means which will cause the starch feeding mechanism to cease to operate when the trays are not in position beneath the discharge opening of the hopper 11. This means may consist of an axially movable clutch collar 19 arranged on the shaft 18 and turning with said shaft to make and break connection between the shaft and the sprocket 17, which is mounted to turn loosely on the shaft 18. This clutch collar may be operated by a bell crank lever 20 pivoted at 21 to the frame of the machine and connected by a link 22 to an arm 23 on a trip device 24, said trip device being arranged above the trays to turn about an axis 25 and to engage with the trays moving with the endless carrier 5, the engagement being beneath the discharge opening of the hopper 11 so that as long as the tray is under the discharge opening of the hopper 11, the trip device will be held up and will in turn hold the clutch 19 in cooperation with the sprocket wheel 17, thus causing the driving of the agitator 13. However, when the trays pass beyond the discharge opening of the hopper 11, this trip device will drop and the clutch 19 will then be moved out of connection with the pulley 17 preferably under the action of a spring 26, thus causing the feeding of the starch dropping mechanism to cease.

The operation of the invention will be understood from the foregoing, but it may be summarized as follows:

The empty trays are placed upon the conveyor at the right hand side of the machine and are fed by the conveyor step-by-step beneath the hopper 1, which deposits candy in such trays, the latter then passing beyond the hopper and cooperating with the trip 24 to maintain driving connection between the step-by-step feeding mechanism for the trays and the driving connection for the starch dropping mechanism. With each step or movement of the tray feeding mechanism, movement is also imparted to the agitator 13, causing the starch to drop upon the candy in the tray underneath the hopper 11. When no tray engages the trip 24, then the starch feeding mechanism ceases to operate as the clutch 19 is moved by the spring 26 out of connection with the driving means for the agitator.

From the foregoing it may be seen that there has been provided a starch dropping mechanism for depositing machines in which the starch is dropped only when a tray is moving beneath the discharge opening of the starch dropping mechanism. By this arrangement, the waste which has heretofore been present is entirely eliminated.

What I claim as my invention and desire to secure by Letters Patent is:—

1. In combination with a depositor comprising a hopper and an intermittently operating mechanism for feeding mold trays under the hopper; a starch feeding receptacle having a discharge opening arranged to drop starch upon trays on said tray feeding mechanism, and means for controlling said discharge opening, said means being controlled by trays passing under said discharge opening on said tray feeding mechanism.

2. In combination with a tray feeding mechanism; a starch feeding mechanism having driving connection with said tray feeding mechanism, said driving connection having a clutch therein, and a trip device controlled by the trays on the tray feeding mechanism and controlled by said clutch.

3. In combination with a tray feeding mechanism; a starch feeding mechanism, and driving means for the starch feeding mechanism having a clutch therein controlled by the trays on the tray feeding mechanism.

4. In combination with an endless tray feeding mechanism; a starch receptacle having a discharge opening arranged to drop starch on trays on said tray feeding mechanism, a screen covering said discharge opening, an agitator operating on said screen, a driving connection between said agitator and the endless tray feeding mechanism, a clutch in said driving connection, and means arranged to be engaged by trays operating under said discharge opening to control said clutch.

5. In combination with a depositor having an endless tray feeding mechanism, a starch feeding hopper, means for feeding starch from the hopper, and means for connecting and disconnecting the starch feeding means with the tray feeding means, said connecting means being controlled by the trays so that the starch is fed from the hopper only during the passage of trays beneath the starch feeding means.

WILLIAM S. NICHOLSON.